United States Patent
Miura et al.

(10) Patent No.: US 8,570,532 B2
(45) Date of Patent: Oct. 29, 2013

(54) NONCONTACT SURFACE SHAPE MEASURING METHOD AND APPARATUS THEREOF

(75) Inventors: Katsuhiro Miura, Mitaka (JP); Hajime Hirose, Fuchu (JP); Hideo Kotajima, Fuchu (JP); Takao Tsukamoto, Chofu (JP); Minoru Ishima, Kawasaki (JP)

(73) Assignee: Mitaka Kohki Co., Ltd., Tokyo (JP)

( * ) Notice: Subject to any disclaimer, the term of this patent is extended or adjusted under 35 U.S.C. 154(b) by 214 days.

(21) Appl. No.: 13/146,665

(22) PCT Filed: Jan. 28, 2010

(86) PCT No.: PCT/JP2010/051102
§ 371 (c)(1),
(2), (4) Date: Jul. 28, 2011

(87) PCT Pub. No.: WO2010/087391
PCT Pub. Date: Aug. 5, 2010

(65) Prior Publication Data
US 2011/0279826 A1 Nov. 17, 2011

(30) Foreign Application Priority Data
Feb. 2, 2009 (JP) .................... 2009-021903

(51) Int. Cl.
*G01B 11/30* (2006.01)
*G01B 11/24* (2006.01)
*G02B 7/04* (2006.01)
*G02B 27/40* (2006.01)
*G02B 27/64* (2006.01)

(52) U.S. Cl.
USPC .......... 356/609; 356/611; 250/201.4

(58) Field of Classification Search
USPC ............ 356/600–640, 237.1–241.6, 356/242.1–243.8, 426–431
See application file for complete search history.

(56) References Cited

U.S. PATENT DOCUMENTS

| 3,896,304 | A | * | 7/1975 | Aoki et al. | 250/201.7 |
| 4,300,167 | A | * | 11/1981 | Miller et al. | 348/356 |
| 4,577,967 | A | * | 3/1986 | Fujita | 356/489 |
| 4,748,322 | A | * | 5/1988 | Breitmeier | 250/204 |
| 4,806,777 | A | | 2/1989 | Ulbers et al. | |
| 5,247,165 | A | | 9/1993 | Hiruta et al. | |
| 5,256,884 | A | * | 10/1993 | Buck et al. | 250/559.31 |

(Continued)

FOREIGN PATENT DOCUMENTS

| CN | 1534272 | 10/2004 |
| DE | 3536700 | 4/1987 |

(Continued)

OTHER PUBLICATIONS

Germany Office action, dated Nov. 26, 2012 along with an english translation thereof.

(Continued)

*Primary Examiner* — Michael A Lyons
*Assistant Examiner* — Jarreas C Underwood
(74) *Attorney, Agent, or Firm* — Greenblum & Bernstein P.L.C.

(57) ABSTRACT

Even if a return beam from a work to be measured does not agree with the center of a two-piece sensor, a correction value is calculated according to a voltage difference between two sensors of the two-piece sensor if the voltage difference is within a neighborhood range. The correction value is added to an actual position of an objective lens in an up-down direction, to calculate a movement amount of the objective lens up to a focused state (a state in which the return beam agrees with the center of the two-piece sensor).

8 Claims, 5 Drawing Sheets

(56) References Cited

U.S. PATENT DOCUMENTS

| | | | |
|---|---|---|---|
| 6,797,965 B2 * | 9/2004 | Abe | 250/491.1 |
| 7,286,246 B2 * | 10/2007 | Yoshida | 356/605 |
| 8,053,712 B2 * | 11/2011 | Muraoka et al. | 250/201.6 |
| 2005/0151978 A1 | 7/2005 | Nakamura | |
| 2008/0266569 A1 | 10/2008 | Nakamura et al. | |

FOREIGN PATENT DOCUMENTS

| | | |
|---|---|---|
| DE | 3719422 | 6/1988 |
| JP | 05-089480 | 4/1993 |
| JP | 7-43110 | 2/1995 |
| JP | 10-148506 | 6/1998 |
| JP | 11-72311 | 3/1999 |
| JP | 2004-145009 | 5/2004 |
| JP | 2005-201656 | 7/2005 |
| JP | 2008-268122 | 11/2008 |

OTHER PUBLICATIONS

German Official Action of Jul. 17, 2013 and English Language translation thereof.

* cited by examiner

FIG. 2 (I) (II) (III)
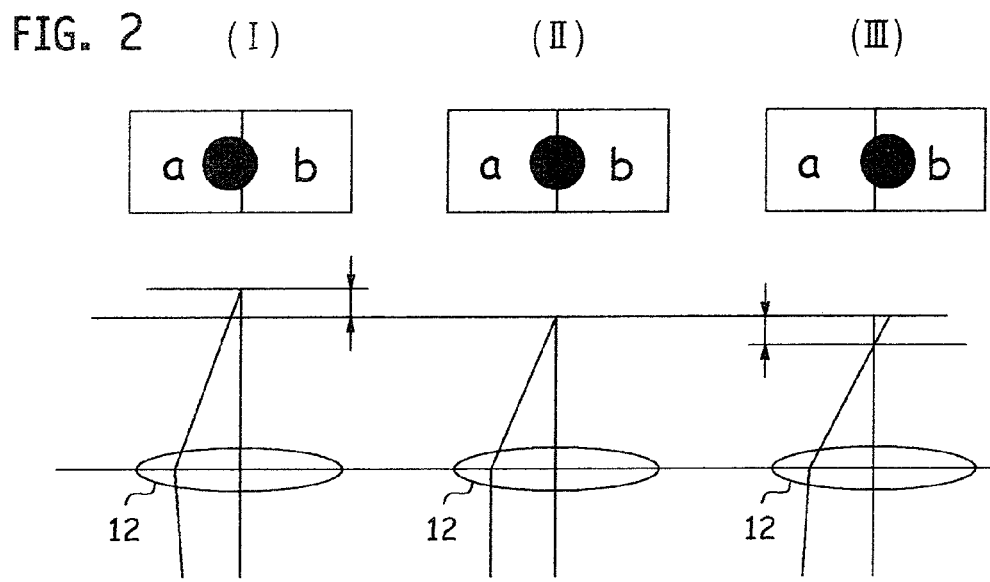
FIG. 3
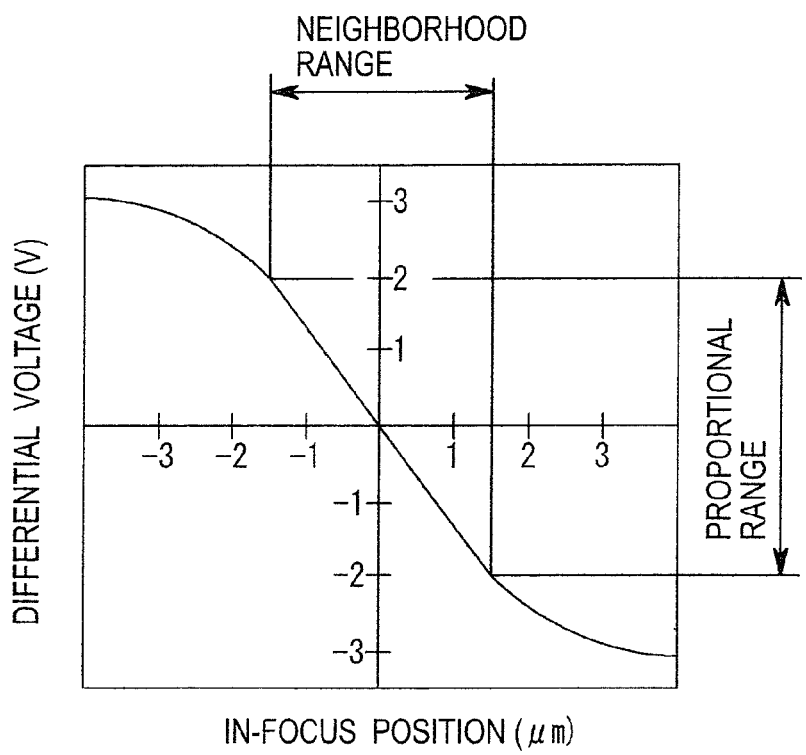

NONCONTACT SURFACE SHAPE MEASURING METHOD AND APPARATUS THEREOF

TECHNICAL FIELD

The present invention relates to a noncontact surface shape measuring method.

BACKGROUND TECHNOLOGY

A noncontact surface shape measuring apparatus of laser probe type using laser autofocusing is used to measure the shape and roughness of a precision component. The top face of a work which is a measurement object is scanned in a horizontal direction at predetermined pitches with a laser beam under autofocusing control. According to a movement amount of an objective lens of an autofocusing optical system in a focusing direction, measurement data related to a surface shape of the work is obtained.

The objective lens is controlled so that, as disclosed in Japanese Patent No. 2125498, a return beam of a laser probe is received at the center of a two-piece sensor. Namely, the work is fed at predetermined pitches, and when a movement of the objective lens causes a return beam from the work to hit the center of the two-piece sensor, it is determined that a focused state is established. Then, an amount of the movement of the objective lens is detected to get height information of the surface of the work. The height information about the surface of the work is obtained at the predetermined pitches, to measure a surface shape of the work.

OUTLINE OF INVENTION

Problems to be Solved by Invention

The related art mentioned above intermittently scans a work to be measured at predetermined pitches, and when it is in focus, height information is obtained. Thereafter, the work is fed at the pitch. This takes a long measurement time.

In consideration of the related art, the present invention provides a noncontact surface shape measuring method capable of measuring the surface shape of a work by continuously, instead of intermittently, scanning the work.

According to a technical aspect of the present invention, the noncontact surface shape measuring method includes detecting a voltage difference between two sensors of a two-piece sensor, detecting whether or not the detected voltage difference is within a neighborhood range in which a voltage difference is linear with respect to a displacement from an in-focus position, calculating, if the detected voltage difference is within the neighborhood range, a correction value in an up-down direction for an objective lens with respect to the in-focus position, and adding the correction value to an actual position in the up-down direction of the objective lens, thereby calculating a movement amount of the objective lens in the up-down direction.

BRIEF DESCRIPTION OF DRAWINGS

FIG. 2 is a perspective view illustrating an optical system above an objective lens FIG. 3 is a schematic view illustrating an optical path of a laser beam

MODE OF IMPLEMENTING INVENTION (First Embodiment)

Figure 1:
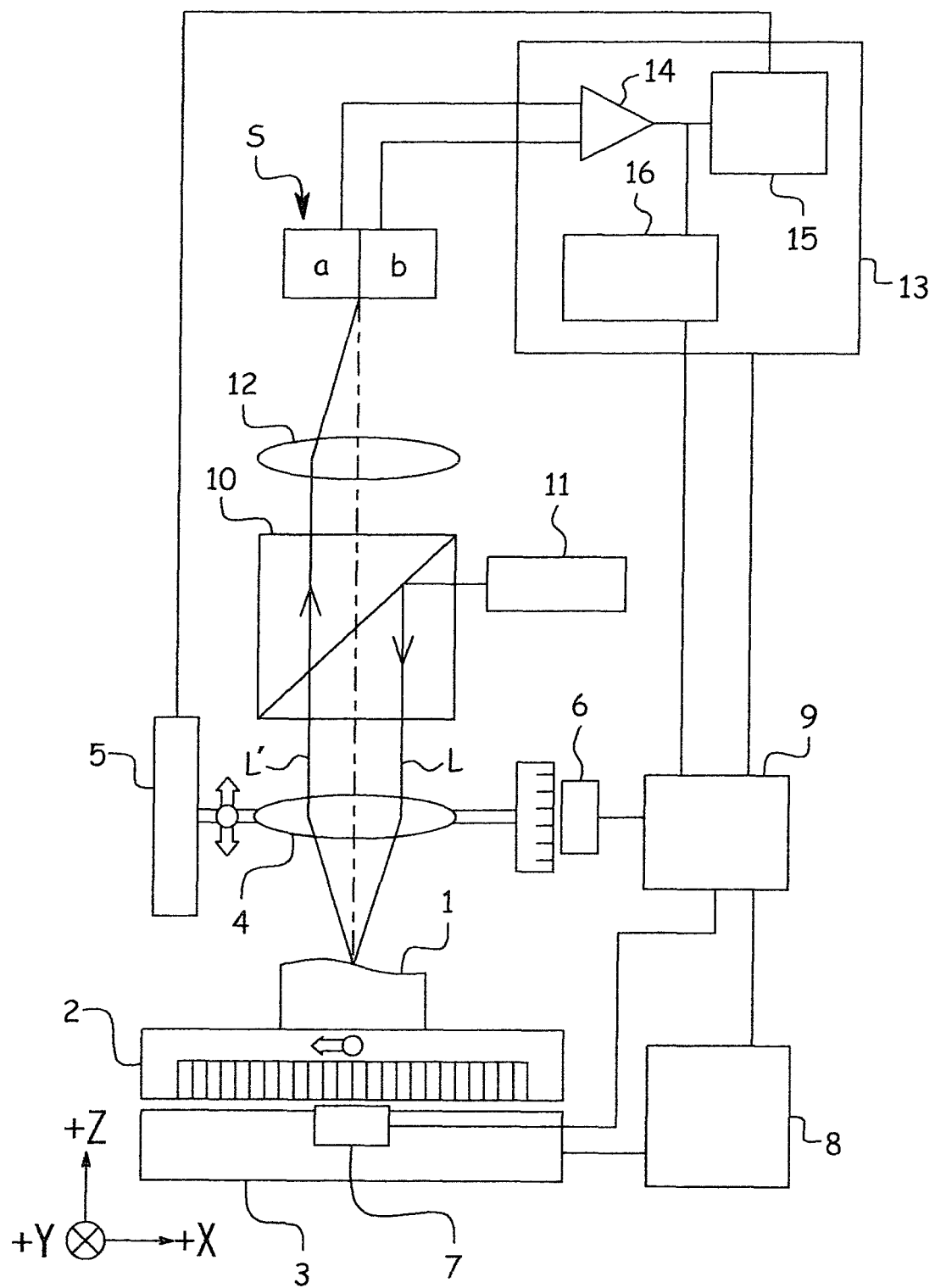
FIG. 1 is a schematic view illustrating a noncontact surface shape measuring apparatus according to a first embodiment of the present invention

FIGS. 1 to 4 are views illustrating the first embodiment of the present invention. In the drawings, X and Y represent two directions that are orthogonal to each other on a horizontal plane and Z represents an up-down direction. FIG. 1 is schematic.

A work 1 to be measured is set on an X-axis stage 2 that is freely slidable in the X-axis direction. The X-axis stage 2 is set on a Y-axis stage 3 that is freely slidable in the Y-axis direction.

Above the work 1, an objective lens 4 is supported with a focusing unit 5 so that the objective lens 4 is freely movable in the Z-axis direction. A position (movement amount) of the objective lens 4 in the Z-axis direction is detected by an AF scale 6. A position (movement amount) of the X-axis stage 2 is detected by an X-axis scale 7. A position (movement amount) of the Y-axis stage 3 is detected by a Y-axis scale that is not illustrated.

The AF scale 6 of the objective lens 4 and a stage driver 8 for driving the X-axis stage 2 and Y-axis stage 3 are connected to a main controller 9, so that movement amounts of the objective lens 4, X-axis stage 2, and Y-axis stage 3 are inputted to the main controller 9. The X-axis stage 2, Y-axis stage 3, and stage driver 8 form a scanner that continuously scans the work 1 in the horizontal directions orthogonal to an optical axis of the objective lens 4 and sweeps the surface of the work 1 with a laser probe L in the horizontal directions.

Above the objective lens 4, there is a beam splitter 10. The beam splitter 10 has a function of transmitting 50% of light and reflecting 50% of the same. On a side of the beam splitter 10, there is arranged a laser beam emitting unit 11. The laser beam emitting unit 11 is a semiconductor laser to emit a laser beam L in a horizontal direction. The laser beam L is reflected by the beam splitter 10 in a direction parallel to the Z-axis and is transmitted through the objective lens 4, to hit the surface of the work 1. An optical weighted center of a section of the laser beam L passes through a position that is out of an optical axis center of the objective lens 4.

The laser beam L is reflected by a surface of the work 1 and a return beam L' is again transmitted through the objective lens 4 and is transmitted through the beam splitter 10, to form an image through an imaging lens 12.

The position of the spot of the return beam L' formed through the imaging lens 12 is detected by a two-piece sensor S, i.e., a photosensor. The two-piece sensor S has two sensors "a" and "b" that are closely arranged side by side.

When the optical weighted center of the spot of the return beam L' agrees with the center of the two-piece sensor S, outputs from the two sensors a and b balance with each other. In this case, the laser beam L transmitted through the objective lens 4 is focused on the surface of the work 1. A center sketch of FIG. 2 illustrates (II) an in focus state and side sketches thereof illustrate (I) an inwardly displaced state and (III) an outwardly displaced state with respect to the in focus state.

Outputs from the two sensors a and b are inputted to an AF controller 13. The AF controller 13 has a comparator 14, a control circuit 15, and a voltage-displacement conversion circuit 16. The AF controller 13 is connected to the main controller 9.

So as to equalize the outputs from the two sensors a and b with each other, the control circuit 15 outputs a signal to the focusing unit 5 to move the objective lens 4. According to a movement amount of the objective lens 4, height information about the surface of the work 1 is detected.

The work 1 is continuously scanned with the laser beam L by moving the X-axis stage 2 at a constant speed (S2). Autofocusing control of the laser beam L is carried out to continuously scan the work 1, thereby measuring a surface shape of the work 1 along the X-axis.

When the return beam L' hits the center (neutral position) of the two-piece sensor S of the present embodiment and outputs from the two sensors a and b are equal to each other, the objective lens 4 is focused on the work 1. It is not always necessary to move the objective lens 4 to an in-focus position when continuously carrying out measurement.

As illustrated in FIG. 3, a voltage difference between the two sensors a and b of the two-piece sensor S is a function of the optical weighted center of a spot and corresponds to a displacement amount of the objective lens 4 up to an in-focus position. In particular, in a neighborhood range around an in-focus position (a range of several micrometers around the in-focus position), the voltage difference is substantially proportional to the optical weighted center of a spot. Accordingly, if the voltage difference comes in the neighborhood range (linear region), a movement amount of the objective lens 4 up to the in-focus position can be calculated in stead of moving the objective lens 4 to the final in-focus position. Namely, when the objective lens 4 comes in the neighborhood range, the position thereof is added to a correction value calculated to represent a distance from the position of the objective lens 4 up to the in-focus position, thereby providing a movement amount of the objective lens up to the in-focus position (S6).

Movement amounts of the objective lens 4 are continuously provided while the work 1 is being continuously scanned, so that height information about the surface of the work 1 is continuously obtained to measure a shape of the work 1 in the X-axis direction. The shape measurement in the X-axis direction is continued by slightly shifting the work 1 in the Y-axis direction, to measure a three-dimensional shape of the surface of the work 1.

If the voltage difference detected by the two-piece sensor S is out of the neighborhood range, the measuring method may increase an error or cause a lack of measurement data for a portion that is out of the neighborhood range.

Even if the voltage difference is in a nonlinear region out of the neighborhood range, measurement is possible if the laser beam spot partly reaches both the sensors a and b of the two-piece sensor S to allow the detection of a voltage difference. Since a relationship (nonlinear characteristic) between the optical weighted center of a spot and a voltage difference, i.e., a movement amount of the objective lens 4 up to an in-focus position is known, it is possible to measure a shape by expanding the neighborhood range over the nonlinear region of the two-piece sensor S. This, however, increases a measurement error. In this case, non-linear characteristic data (table) is stored in the main controller 9, to quickly calculate (convert) a movement amount of the objective lens up to an in-focus position according to a detected voltage difference.

To measure an "undulated shape" of the surface of the work 1, the surface must widely be measured to find a tendency of the surface. In this case, priority is given to a measuring time than a measuring accuracy. There is no problem even if there is a region involving an error or a lack of measurement data.

Figure 4:
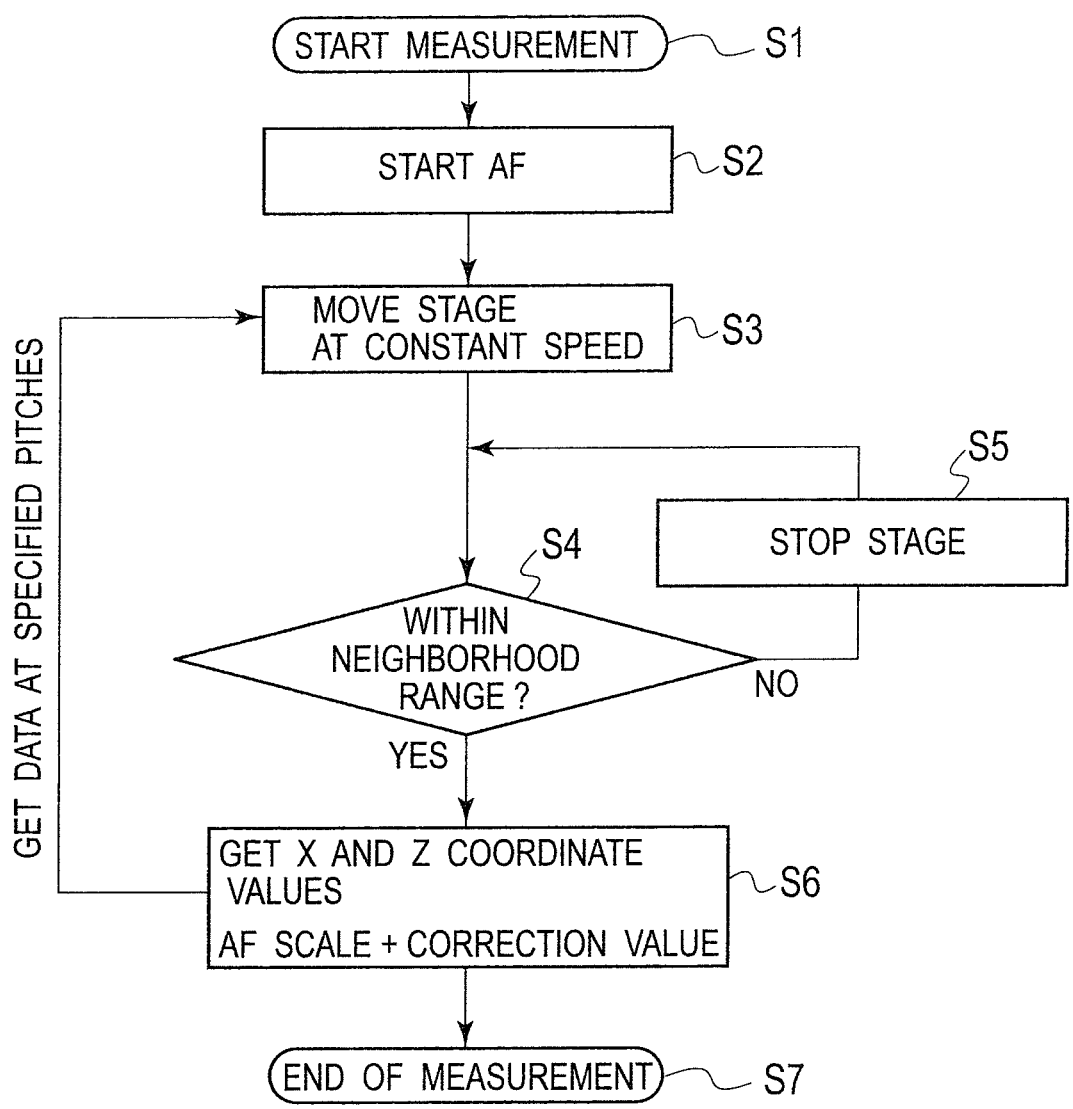
FIG. 4 is a flowchart illustrating a measuring method

If it is necessary to accurately measure a surface shape of the work 1, the flowchart (S1 to S7) of FIG. 4 will be followed. If a voltage difference from the two-piece sensor S is out of the neighborhood range, scanning of the work 1 in the X-axis direction is stopped until the voltage difference comes within the neighborhood range (S4 and S5). This may elongate a measurement time but it may correctly and accurately measure the shape without lack of data. Even if the continuous scanning of the work 1 is partly stopped, it is possible to greatly shorten a measurement time compared with the related art that waits for an in focus state at every pitch.

(Second Embodiment)

Figure 5:
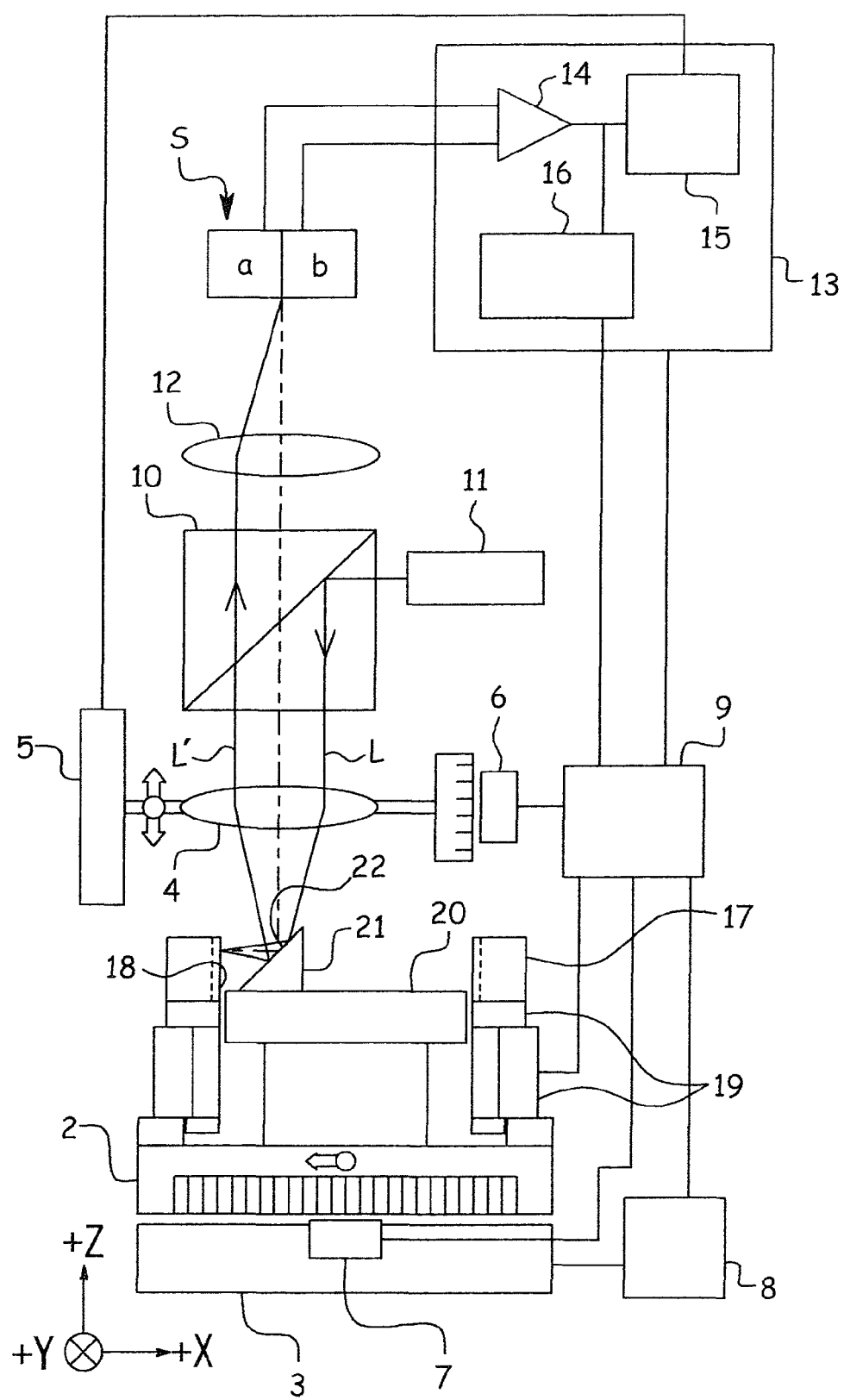
FIG. 5 is a schematic view illustrating a noncontact surface shape measuring apparatus according to a second embodiment of the present invention
Figure 6:
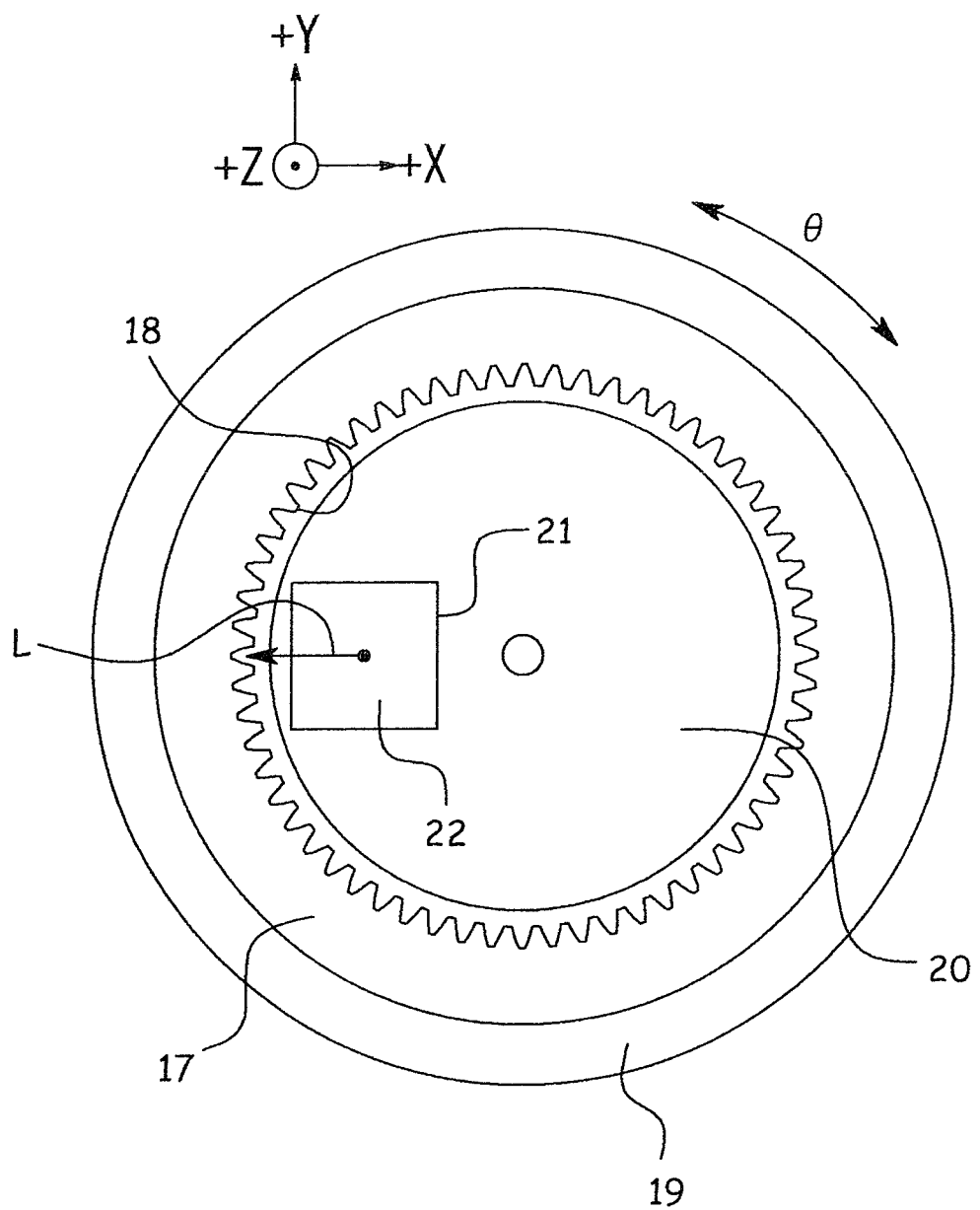
FIG. 6 is a plan view illustrating an internal gear and a rotary stage

FIGS. 5 and 6 are views illustrating the second embodiment of the present invention. This embodiment has component elements that are similar to those of the first embodiment. Accordingly, the like component elements are represented with common reference marks to omit a repetition of explanation.

A work as a measurement object according to the present embodiment is an internal gear 17 substantially having a ring shape and provided with internal teeth 18 formed on an inner face thereof. The internal gear 17 is set on a rotary stage 19 having a similar hollow structure. The rotary stage 19 is set on an X-axis stage 2, to freely rotate in a θ-direction. The rotary stage 19 is connected to a stage driver 8 like the X-axis stage 2 and a Y-axis stage 3.

Inside the rotary stage 19 having the hollow structure, a circular center stage 20 is set on the X-axis stage 2. At an edge of the center stage 20, there is arranged a prism 21 as a reflection unit with a square reflection plane 22 inclined by 45 degrees being outwardly oriented. It is set so that a laser beam L transmitted through an objective lens 4 hits the reflection plane 22 of the prism 21.

The laser beam L reflected by the reflection plane 22 hits the internal tooth 18. A return beam L' reflected by the internal tooth 18 of the internal gear 17 is again reflected by the reflection plane 22, is made incident to the objective lens 4, is again transmitted through the objective lens 4, and is detected on an optical path that is the same as that of the preceding embodiment. The rotary stage 19 rotates the internal gear 17, the laser beam is automatically focused on the surface of the internal tooth 18, and height dimensions (irregularity displacements) of the internal tooth 18 in the X-axis direction are measured.

In the case of measuring an inner face of a work, too, there is no need of moving the objective lens 4 to a final in-focus position if a voltage difference between two sensors a and b of a two-piece sensor S is within a neighborhood range. If this condition is met, a movement amount of the objective lens 4 up to an in-focus position is calculable. Accordingly, the internal gear 17 is continuously scanned in the rotation direction to measure a shape of the inner face of the internal teeth 18 in a short time.

Effect of Invention

According to the present invention, even if a return beam from a work to be measured does not agree with the center of the two-piece sensor, a voltage difference between the two sensors of the two-piece sensor is used to calculate a correction value if the voltage difference is within a neighborhood range. The correction value is added to an actual position of the objective lens in an up-down direction, to calculate a movement amount of the objective lens up to a focused state (up to a position where the return beam agrees with the center of the two-piece sensor). In this way, an actual focused state is not always needed and the state that a voltage difference is within the neighborhood range is sufficient to measure a surface shape of the work. Namely, the surface shape of the work is measurable by continuously scanning the work. This shortens a measurement time.

If the voltage difference between the two sensors of the two-piece sensor is out of the neighborhood range, the continuous scanning of the work in a horizontal direction is stopped. This technique correctly measures a surface shape involving shape variations without increasing measurement errors or causing a lack of measurement data.

(United States Designation)

In connection with United States designation, This application claims benefit of priority under 35USC §119 to Japanese Patent Applications No. 2009-21903, filed on Feb. 2, 2009, the entire contents of which are incorporated by reference herein.

The invention claimed is:

1. A noncontact surface shape measuring method for carrying out autofocusing control by way of a laser probe in an up-down direction with respect to a surface of a work, continuously scanning the work in a horizontal direction, and measuring a surface shape of the work according to a displacement amount in the up-down direction of an objective lens in an autofocusing optical system that is controlled so that a return beam of the laser probe is received at the center of a two-piece sensor, the noncontact surface shape measuring method comprising:
   detecting a voltage difference between two sensors of the two-piece sensor and detecting whether or not the detected voltage difference is within a neighborhood range in which a voltage difference is substantially proportional to a displacement from an in-focus position;
   calculating, if the detected voltage difference is within the neighborhood range, a correction value for a position of an objective lens in the up-down direction with respect to the in-focus position; and
   adding the correction value to an actual position of the objective lens in the up-down direction, to calculate a movement amount of the objective lens in the up-down direction.

2. The noncontact surface shape measuring method according to claim 1, wherein if the detected voltage difference is not in the neighborhood range, the continuous scanning in the horizontal direction is stopped until the voltage difference comes within the neighborhood range.

3. The noncontact surface shape measuring method according to claim 1, wherein the neighborhood range is expanded to a range in which the two-piece sensor is able to detect a potential difference and a detected potential difference is nonlinear with respect to a displacement from the in-focus position.

4. A noncontact surface shape measuring apparatus for carrying out autofocusing control of a laser probe in an up-down direction with respect to a surface of a work to be measured and measuring a surface shape of the work according to a displacement amount in the up-down direction of an objective lens in an autofocusing optical system, comprising:
   a scanner configured to continuously scan the work in a direction that is horizontal with respect to an optical axis of the objective lens; and
   a controller configured to control a movement amount of the objective lens in the up-down direction so that a return beam of the laser probe is received at the center of the two-piece sensor, wherein the controller:
   detects a voltage difference between two sensors of a two-piece sensor and detects whether or not the detected voltage difference is within a neighborhood range in which a voltage difference is related to a displacement from an in-focus position;
   calculates, if the detected voltage difference is within the neighborhood range, a correction value for a position of an objective lens in the up-down direction with respect to the in-focus position; and
   adds the correction value to an actual position of the objective lens in the up-down direction, to calculate a displacement amount of the objective lens in the up-down direction.

5. The noncontact surface shape measuring apparatus according to claim 4, wherein the neighborhood range is a range in which a detected potential difference has a linear relationship with respect to a displacement from the in-focus position.

6. The noncontact surface shape measuring apparatus according to claim 4, wherein if the detected voltage difference is not in the neighborhood range, the continuous scanning in the horizontal direction is stopped until the voltage difference comes in the neighborhood range.

7. The noncontact surface shape measuring method according to claim 2, wherein the neighborhood range is expanded to a range in which the two-piece sensor is able to detect a potential difference and a detected potential difference is nonlinear with respect to a displacement from the in-focus position.

8. The noncontact surface shape measuring apparatus according to claim 5, wherein if the detected voltage difference is not in the neighborhood range, the continuous scanning in the horizontal direction is stopped until the voltage difference comes in the neighborhood range.

* * * * *